(12) United States Patent
Yu et al.

(10) Patent No.: US 10,893,765 B2
(45) Date of Patent: Jan. 19, 2021

(54) SYSTEM AND METHOD OF AN ATTACHABLE SPICE DISPENSING DEVICE FOR AN AUTOMATIC MEAL PREPARATION APPARATUS

(71) Applicant: Kitchen Mate Inc., Toronto (CA)

(72) Inventors: Yang Yu, Toronto (CA); Yousuf Chowdhary, Maple (CA)

(73) Assignee: Kitchen Mate Inc., Toronto (CA)

( * ) Notice: Subject to any disclaimer, the term of this patent is extended or adjusted under 35 U.S.C. 154(b) by 270 days.

(21) Appl. No.: 15/191,156

(22) Filed: Jun. 23, 2016

(65) Prior Publication Data

US 2016/0374486 A1 Dec. 29, 2016

Related U.S. Application Data

(60) Provisional application No. 62/185,219, filed on Jun. 26, 2015.

(51) Int. Cl.
| | |
|---|---|
| *A47J 47/01* | (2006.01) |
| *A47G 19/34* | (2006.01) |
| *A23L 27/14* | (2016.01) |
| *G01F 11/46* | (2006.01) |
| *G01F 11/00* | (2006.01) |

(52) U.S. Cl.
CPC .............. *A47G 19/34* (2013.01); *A23L 27/14* (2016.08); *A47J 47/01* (2013.01); *G01F 11/006* (2013.01); *G01F 11/46* (2013.01)

(58) Field of Classification Search
CPC ........ G01F 11/006; G01F 11/46; A23L 27/14; A47G 19/34; B01F 13/1055; B01F 13/1058; B01F 13/0237; B05B 11/0054; B65D 2583/005; B67D 1/0078

USPC .................................................. 222/309, 325
See application file for complete search history.

(56) References Cited

U.S. PATENT DOCUMENTS

| | | | | | |
|---|---|---|---|---|---|
| 4,776,489 | A | * | 10/1988 | Tarlow | A47F 1/03 222/132 |
| 5,975,366 | A | * | 11/1999 | Ridgley | A47J 47/01 222/132 |
| 6,843,166 | B1 | * | 1/2005 | Li | A47J 27/14 99/327 |
| 7,337,920 | B2 | * | 3/2008 | Duck | B67D 1/0878 222/129.4 |

(Continued)

OTHER PUBLICATIONS

"EveryCook—Let It cook for you!", downloaded from web site http://everycook.org/ on Dec. 14, 2015.

(Continued)

*Primary Examiner* — Charles Cheyney
(74) *Attorney, Agent, or Firm* — Moser Taboada

(57) ABSTRACT

A spice dispensing device is provided for an automatic meal preparation apparatus. The device uses a replaceable cartridge containing a volume of spice for dispensing in predetermined volumetric doses. A dispensing mechanism is built in to the cartridge for isolating the predetermined volumetric dose and moving it toward an opening in the bottom of the cartridge. The cartridge is sized and shaped to be placed into the automatic meal preparation apparatus in a rack for containing a plurality of such cartridges. The cartridge is alignable with a position in the rack in which the spice dose can be dispensed directly into a cooking vessel of the apparatus.

11 Claims, 11 Drawing Sheets

(56) References Cited

U.S. PATENT DOCUMENTS

| | | | |
|---|---|---|---|
| 7,614,429 B2* | 11/2009 | Pluvinage | B01L 3/021 141/375 |
| 8,176,950 B2* | 5/2012 | Luchinger | G01F 11/00 141/104 |
| 8,240,513 B2* | 8/2012 | Voskuil | B01F 13/1058 222/144 |
| 8,276,505 B2* | 10/2012 | Buehler | A23L 5/10 99/326 |
| 8,561,841 B2* | 10/2013 | Erman | A47J 31/402 222/135 |
| 8,896,424 B2* | 11/2014 | Reif | B01F 15/0445 251/129.01 |
| 9,011,955 B2* | 4/2015 | de Graaff | A47J 31/42 241/101.2 |
| 9,022,258 B2* | 5/2015 | Nehren | B01F 13/1055 222/390 |
| 9,205,283 B2* | 12/2015 | Miklatzky | A45D 19/02 |
| 9,469,463 B2* | 10/2016 | Murray | B65D 85/8043 |
| 9,591,943 B2* | 3/2017 | Murray | A47J 31/404 |
| 10,143,228 B2* | 12/2018 | Vardakostas | A21C 9/04 |
| 10,231,567 B2* | 3/2019 | Perrelli | B67D 1/0016 |
| 10,512,366 B1* | 12/2019 | Kadoch | A47J 47/01 |
| 2007/0084520 A1* | 4/2007 | Driessen | B01F 13/1058 141/2 |
| 2013/0062366 A1* | 3/2013 | Tansey | G06Q 30/0269 222/102 |
| 2014/0114469 A1* | 4/2014 | Givens | B67D 1/0041 700/232 |
| 2014/0322417 A1 | 10/2014 | Kim | |
| 2016/0081515 A1 | 3/2016 | Aboujassoum et al. | |

OTHER PUBLICATIONS

"Sereneti Kitchen", downloaded from web site http://www.sereneti.com/ on Dec. 14, 2015.

"Mijoteur Moulinex CE7038 Cookeo Connect Smart Noir (4054075)", downloaded from web site http://www.darty.com/nav/achat/petit_electromenager/cuisson_quotidienne-cuiseur_mijoteur/mijoteur/moulinex_ce7038.html on Dec. 14, 2015.

"Multicuiseur Intelligent Cookeo USB—Moulinex", downloaded from web site http://www.moulinex.fr/Cuisson/Cookeo-%26-Multicuiseurs/Cookeo-Usb/p/7211001368 on Dec. 14, 2015.

* cited by examiner

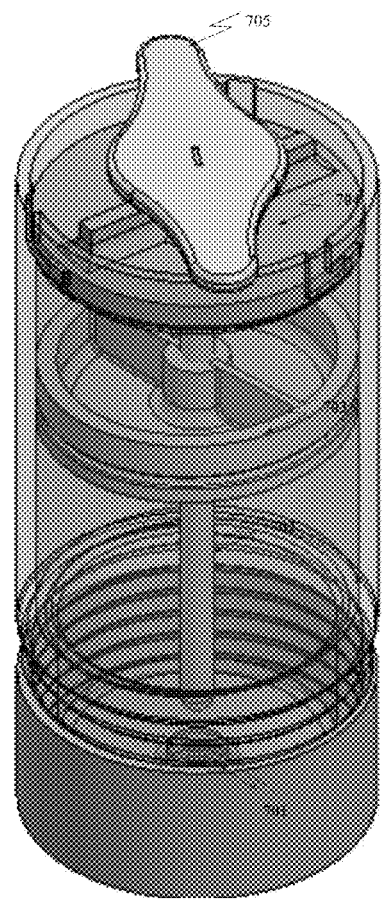
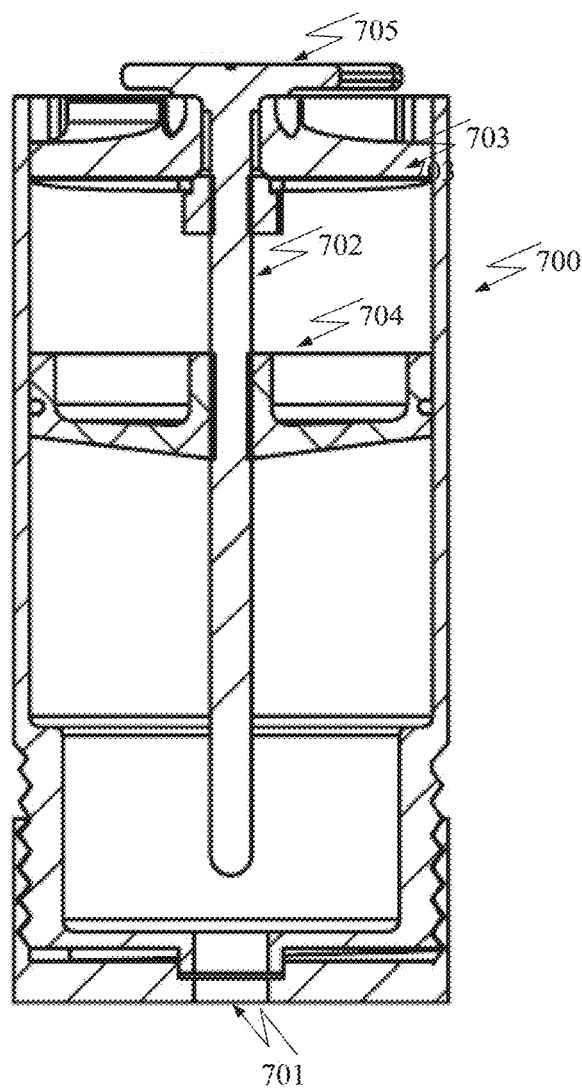
FIG. 7A
FIG. 7B

SYSTEM AND METHOD OF AN ATTACHABLE SPICE DISPENSING DEVICE FOR AN AUTOMATIC MEAL PREPARATION APPARATUS

FIELD OF INVENTION

The invention in general relates to automated devices for meal preparation and in particular relates to spice dispensing mechanisms for same.

BACKGROUND OF THE INVENTION

Preparing a homemade meal is not always straightforward. It not only involves actually cooking the food, but also deciding what to cook, and knowing how to cook it. Often times, this involves following recipes precisely, sourcing the right ingredients and spices, and adding the precise quantities at the right time so that each ingredient is cooked to perfection. Failing to follow the recipe may lead to undesirable outcomes. If everything is performed accordingly, a homemade meal is not only delicious, but also very nutritious. While cooking can be an enjoyable experience, in today's fast paced world, it is often rather a tedious chore.

Recipes for many types of meals have been around for awhile and were passed orally from one generation to another. Recipe books focused on many different types of cuisines are available like cook books for Chinese stir fries, Indian curries, Mexican etc. Cookbooks are also available for different types of meals and delicacies including for example recipe books for seafood, desserts, sandwiches, soups, etc. People generally share such books or recipes that they have tried from the aforementioned sources.

In recent years, books and paper based recipe collections have evolved to the digital realm with recipe search engines like Foodily which is also considered a social recipe network. Similarly, apps for recipes also exist that can be installed on mobile devices like tablets or Smartphones, e.g. "Yummly Recipes", "Food Network in the Kitchen", "PetitChef" etc.

But neither cookbooks, recipe search engines nor recipes apps, prepare the meals automatically, nor can these recipes can be used with any devices that can prepare meals automatically. Meal preparation is still a very laborious and time consuming activity that also requires a certain skill.

Making food quickly and well can be easy once one has mastered how to cook; but it is a learned skill, the acquisition of which takes time, practice, patience and the acceptance of mistakes. To cook whole foods at a pace that can match box-meal offerings, one needs to know how to make substitutions on the fly; how to doctor a dish that has been oversalted or overspiced; how to select produce and know for how long one has to cook it, amongst other variables.

Prior art methods lack the ability to convert favorite recipes so that an automated meal preparation apparatus can automatically prepare them. Thus, we note that prior art methods have inherent limitations and are in need of improvement.

It would be desirable to have a method of employing an automatic meal preparation apparatus, which uses automated spice dispensing.

SUMMARY

Broadly stated, the invention provides a system and a method of automatic meal preparation that allows for a "eating without having to cook" experience. Using the apparatus, cooking from whole ingredients can be easy, cost-effective and healthy.

The apparatus, system and method are capable of preparing different recipes from various cuisines by using spices that are supplied in removable cartridges. The automatic meal preparation apparatus is computer assisted for controlling the time of cooking, intensity of heat, amount of spices, combination of spices, timing when individual raw ingredients are added to the cooking vessel, etc. One type of apparatus which can be beneficially used for the present method and system is disclosed in applicants' previously filed USPTO patent application Ser. No. 14/952,142 filed on Nov. 25, 2015, the contents of which are incorporated herein by reference.

A system and method may be provided for a detachably attachable spice dispensing device for an Automatic Meal Preparation Apparatus (AMPA). The user preferably acquires one or more detachably attachable spice dispensing devices. These spice dispensing devices may be purchased by a user from a retail store, an online store, or the user may acquire them with the purchase of an Automatic Meal Preparation Apparatus (AMPA).

The user may open the lid of the AMPA to access the spice rack. Therein the user can insert or attach one or more spice dispensing devices in the one or more slots in the spice rack in the Automatic Meal Preparation Apparatus (AMPA). The top lid of the AMPA is then closed to begin a cooking process, which can use one or more of the spice dispensing devices. To begin the cooking process, the user selects a recipe for meal preparation e.g. a user may use a companion app that may be installed on a mobile device e.g. a Smartphone or a tablet. Alternatively, there may be a user interface built in the AMPA with an LCD screen and buttons to navigate the menu of instructions. There may be other methods of selecting a recipe. Once a recipe is selected and a cooking process is initiated, the AMPA can automatically carry out recipe steps for preparing a meal. Certain user steps (such as adding specific raw ingredients and filling a water reservoir) may be part of the recipe steps.

Preferably, the spice dispensing devices are shaped to fit specially designed cavities in the spice rack. In one embodiment, these may be more or less cylindrical in shape (other shapes such as elliptical or conical could also be used). Each spice dispensing device has an outer wall, a top lid that may be sealed (so that the user does not have access to the spice), one or more locating features, such as ridges or notches, to keep the spice dispensing device in place and prevent it from moving once it is placed inside a spice rack cavity. The bottom of each spice dispensing device preferable has an opening and a mechanism to dispense the spice from the selected spice dispensing device into the cooking vessel.

Each spice dispensing device is removable from the spice rack. The AMPA has a computer controlled mechanism for selecting a spice dispensing device enabled by the gear assembly and associated electronics and a mechanism for spice dispensing for the precise measurement and dispensation of the spice in the right amount enabled by the gear assembly and the associated electronics at the right time when automatically preparing a meal.

The spice dispensing device may be manufactured with hydrophobic material so that it repels any moisture that allows for a longer shelf life of the spice contained within. The spice dispensing device preferably has an opening at the bottom for dispensing the spice. This may be provided with a valve for preventing leaks or unintended dispensing when not in use. For example, an inverse concave rubber or similar material stopper with a slit may be provided such that when pressure is applied the concave part stretches open the slit. There may be a mechanism for opening a spice dispensing device cartridge gate which has a one directional opening and only opens when a spice dispensing device within the spice rack is aligned correctly.

The term spice may include but is not limited to culinary herbs, spices and/or any other food or drink additives of mostly botanical origin but may include minerals like salt, used for flavoring, seasoning or coloring. Examples of some spice cartridges include but are not limited to the following: salt, pepper, Thai chill sauce, spicy red curry paste, aged cooking wine, aged soya sauce, garlic paste, ginger paste, granular sea salt, coarse ground black pepper, ground red paprika, oregano, sticks of cinnamon, whole cloves, whole black peppers etc. that are ground on demand, or dispensed from their respective cartridges whole.

In one embodiment of the invention, the spice dispensing device may be designed for powder, solid, liquid or gel contents depending on the spice and its physical form. Each spice dispensing device may contain a unique code that may define its contents, its date of manufacture, its quantity, its brand, etc. In one embodiment, this metadata about the spice dispensing device may be saved on a server and the AMPA acquires this metadata from the server when a spice dispensing device is placed in the spice rack and the top lid of the AMPA is closed. The AMPA may have sensors or electronic sub-components that may scan or read the unique code from the individual spice dispensing device.

Each spice dispensing device may have a code that identifies it uniquely. Such a unique code, in addition to providing the spice identification, may also provide details of what kind of spice or sauce is contained in the cartridge, where the spice dispensing device was purchased from, when the spice dispensing device was manufactured, if there is an expiry date of the contents of the spice dispensing device when does it expire, what free or paid privileges may be associated with that particular spice dispensing device (for example how may free recipes or free instances of a recipe can be downloaded from the recipe portal) etc.

The unique code of a spice dispensing device may be directly read by the AMPA when the top lid of the apparatus is closed. Such automatic unique code reading may include steps like scanning the unique spice dispensing device code or ID, and if the details associated with the unique code are not available locally on the AMPA acquiring the same from the recipe portal or the like by connected to the internet to access such a resource. The list of recipes may be automatically filtered so that they include only recipes that can be prepared with the spice dispensing device whose unique code was scanned earlier.

In one embodiment when adding spices to a meal being prepared by the AMPA, the quantities of spice may be automatically adjusted based on the actual weight of the fresh produce added by a user. For example if a recipe calls for 200 g of beef but a user added 250 g of beef to the fresh rack, therefore automatically adjust the quantities of different spices based on the amount/weight of the fresh ingredient added by the user. In such embodiments, there may be an electronic scale or an electronic weighing mechanism built in to the AMPA that has the ability to sense the weight of the fresh ingredients added by a user.

A central database may be provided for storing and categorizing recipes. In one embodiment, a portal may be provided that is specifically designed for storing, categorising and making these recipes available for download by users.

The database may include but is not limited to the following: a list of spices and spice cartridges and their equivalents; a list of different meats e.g. beef, lamb, chicken, turkey, fish and their preparation instructions e.g. fillet, cube, mince etc. and cooking temperature and duration thresholds; a list of vegetables e.g. potatoes, cauliflower, zucchini, tomatoes, onions, etc. and their preparation instructions e.g. slice, cube, puree, chop etc. and cooking temperature and duration thresholds; a list of oils and sauces and any other kind of ingredients that may be used in meal preparations. The database may also include the conversion factors for the spices e.g. 1 teaspoon is equal to 5 g dry, 1 teaspoon is equal to 5 ml liquid and 1 tablespoon is equal to 15 ml liquid etc.; a list of heating, temperature and duration conversions e.g. medium heat for 5 minutes may be converted to 45% of the induction heat for 4 minutes etc.; a list of stirring and mixing instructions and conversions e.g. stir gently for 3 minute may imply stirring at 10 RMP in clockwise direction, while stir vigorously for 5 minutes may imply stirring at 20 RMP first in clockwise and then in a anticlockwise direction.

According to a first aspect of the invention, a spice dispensing device is provided for an automatic meal preparation apparatus. A replaceable cartridge is used that contains a volume of spice for dispensing in predetermined volumetric doses. A dispensing mechanism is built in to the cartridge for isolating the predetermined volumetric dose and moving it toward an opening in the bottom of the cartridge. The cartridge is sized and shaped to be placed into the automatic meal preparation apparatus in a rack for containing a plurality of such cartridges. The cartridge is alignable with a position in the rack wherein the spice dose can be dispensed directly into a cooking vessel of the apparatus.

The cartridge is preferably sized to contain a volume of spice to permit multiple volumetric doses from the cartridge.

The cartridge may be prefilled with spice, or may be refillable.

The spice may be in a liquid or paste format. In this case, the opening in the cartridge may be provided with a valve to prevent leakage of the liquid or paste. Preferably, the dispensing mechanism is a dispensing disk on a threaded rod, and the dispensing disk, when actuated, operates to force the predetermined volumetric dose of the liquid or paste through the valve. Actuation preferably occurs by rotating at least a portion of the cartridge.

The spice may be a dry or powdered spice. In this case, the opening in the cartridge may have a slot that is alignable with a hopper hole of a divided hopper, the hopper being divided into volumetric dose sizes. Preferably, the dispensing mechanism is a sweeper which, when actuated, rotates to move spice toward the divided hopper and to allow the spice in the hopper hole to exit the slot by gravity when aligned. Actuation preferably occurs by rotating at least a portion of the cartridge.

In certain embodiments, the cartridge may be sealed with a label. The label may be printed with a scannable code to identify the spice.

The cartridge may be weighable by the apparatus to determine a remaining quantity of spice.

The level of spice in the cartridge may also be readable by the apparatus to determine a remaining quantity of spice.

According to a second aspect of the invention, a method is provided for using an automatic meal preparation apparatus. A heating element of the apparatus is selectively heated at predetermined times. At least a portion of raw ingredients preloaded in the apparatus is selectively dispensed by releasing them from a compartment into a cooking vessel in communication with the heating element at a predetermined time. A predetermined dose of spice is selectively dispensed from at least one spice dispensing device by releasing the dose into the cooking vessel at a predetermined time. The ingredients and the spice(s) are stirred and cooked in the vessel for a specified duration, in accordance with a recipe. The spice dispensing device comprises a replaceable cartridge containing a volume of spice for dispensing in predetermined volumetric doses; and a dispensing mechanism built in to the cartridge for isolating the predetermined volumetric dose and moving it toward an opening in the bottom of the cartridge. The cartridge is sized and shaped to be pre-positioned in the apparatus in a rack for containing a plurality of such cartridges, and the cartridge is alignable with a position in the rack wherein the spice dose can be dispensed directly into a cooking vessel of the apparatus.

BRIEF DESCRIPTION OF THE FIGURES

FIGS. 7A and 7B are perspective and sectional views respectively of an exemplary liquid (wet) spice dispensing device.

DETAILED DESCRIPTION

Figure 1:
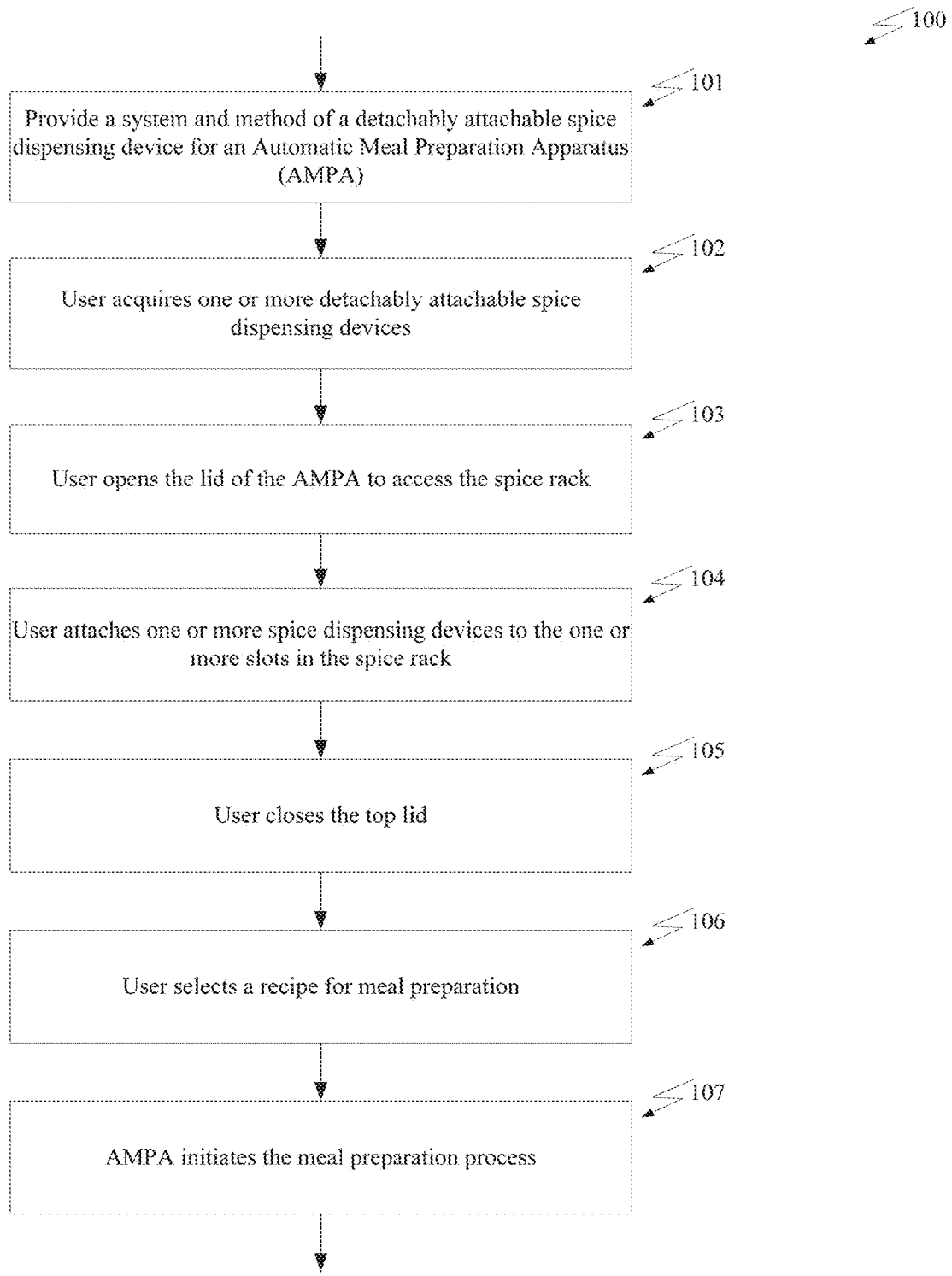
FIG. 1 is a flow diagram of an embodiment of a method of operating an automatic meal preparation apparatus using spice dispensing devices.

Before embodiments of the invention are explained in detail, it is to be understood that the invention is not limited in its application to the details of the examples set forth in the following descriptions or illustrated drawings. It will be appreciated that numerous specific details are set forth in order to provide a thorough understanding of the exemplary embodiments described herein. However, it will be understood that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way, but rather as merely describing the implementation of the various embodiments described herein. The invention is capable of other embodiments and of being practiced or carried out for a variety of applications and in various ways. Also, it is to be understood that the phraseology and terminology used herein is for the purpose of description and should not be regarded as limiting.

Before embodiments of the hardware and software modules or flow charts are described in detail, it should be noted that the invention is not limited to any particular form or shape or software language described or implied in the figures and that a variety of alternative software languages may be used for implementation of the invention.

It should also be understood that many components and items are illustrated and described as if they were hardware elements. However, it will be understood that, in at least one embodiment, the components comprised in the method and tool are actually implemented in software.

As will be appreciated, the present invention may be embodied as a system, method or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. A computing device may include a memory for storing a control program and data, and a processor (CPU) for executing the control program and for managing the data, which includes user data resident in the memory and includes buffered content. The computing device may be coupled to a video display such as a television, monitor, or other type of visual display while other devices may have it incorporated in them (iPad, iPhone etc.). An application or an app or other simulation may be stored on a storage media such as a DVD, a CD, flash memory, USB memory or other type of memory media or it may be downloaded from the internet. The storage media can be coupled with the computing device where it is read and program instructions stored on the storage media are executed and a user interface is presented to a user. For example and without limitation, the programmable computers may be a server, network appliance, set-top box, SmartTV, embedded device, computer expansion module, personal computer, laptop, tablet computer, personal data assistant, game device, e-reader, or mobile device for example a Smartphone. Other devices include appliances having internet or wireless connectivity and onboard automotive devices such as navigational and entertainment systems.

The program code may execute entirely on the apparatus of the invention, or in combination with a mobile device or partly on the mobile device as a stand-alone software package; partly on the mobile device and partly on the apparatus of the invention or partly on the apparatus of the invention and partly on a remote server; or any combination thereof. The remote computer may be connected to the apparatus of the invention via the internet or may be connected to the mobile device through any type of network, including a local area network (LAN) or a wide area network (WAN), or the connection may be made to the internet through a mobile operator network (e.g. a cellular network).

FIG. 1 shows one embodiment 100. A system and method is provided for a detachably attachable spice dispensing device for an Automatic Meal Preparation Apparatus (AMPA) 101. An automatic meal preparation apparatus may be capable of preparing different recipes from various cuisines by using spices that are supplied in removable cartridges. The automatic meal preparation apparatus is computer assisted for controlling the time of cooking, intensity of heat, amount of spices, combination of spies, timing, when individual raw ingredients are to be added to the cooking vessel etc.

The apparatus, system and method of invention provide a meaningful benefit by providing a means for automatic meal preparation and have been disclosed in a previously filed USPTO patent application. One type of apparatus which can be beneficially used in combination with the present enhancements is disclosed in applicants' previously filed USPTO patent application Ser. No. 14/952,142 filed on Nov. 25, 2015, the contents of which are incorporated herein by reference.

The user acquires one or more detachably attachable spice dispensing devices 102. These spice dispensing devices may be purchased by a user from a retail store, an online store, or the user may acquire them with the purchase of an Automatic Meal Preparation Apparatus (AMPA).

The user opens the lid of the AMPA to access the spice rack 103. Therein the user inserts or attaches one or more spice dispensing devices in the one or more slots in the spice rack 104. The user closes the top lid 105.

The user selects a recipe for meal preparation 106. For example, the user may use a companion app that may be installed on a mobile device e.g. a Smartphone or a tablet. In another embodiment there may be a user interface built in the AMPA with an LCD screen and buttons to navigate the menu of instructions. Other methods of selecting a recipe may also be employed.

The AMPA initiates the meal preparation 107 and carries out the steps for preparing a meal automatically. Certain steps such as insertion of raw ingredients and filling the water reservoir may be done by a human before or during this process.

Figure 2:
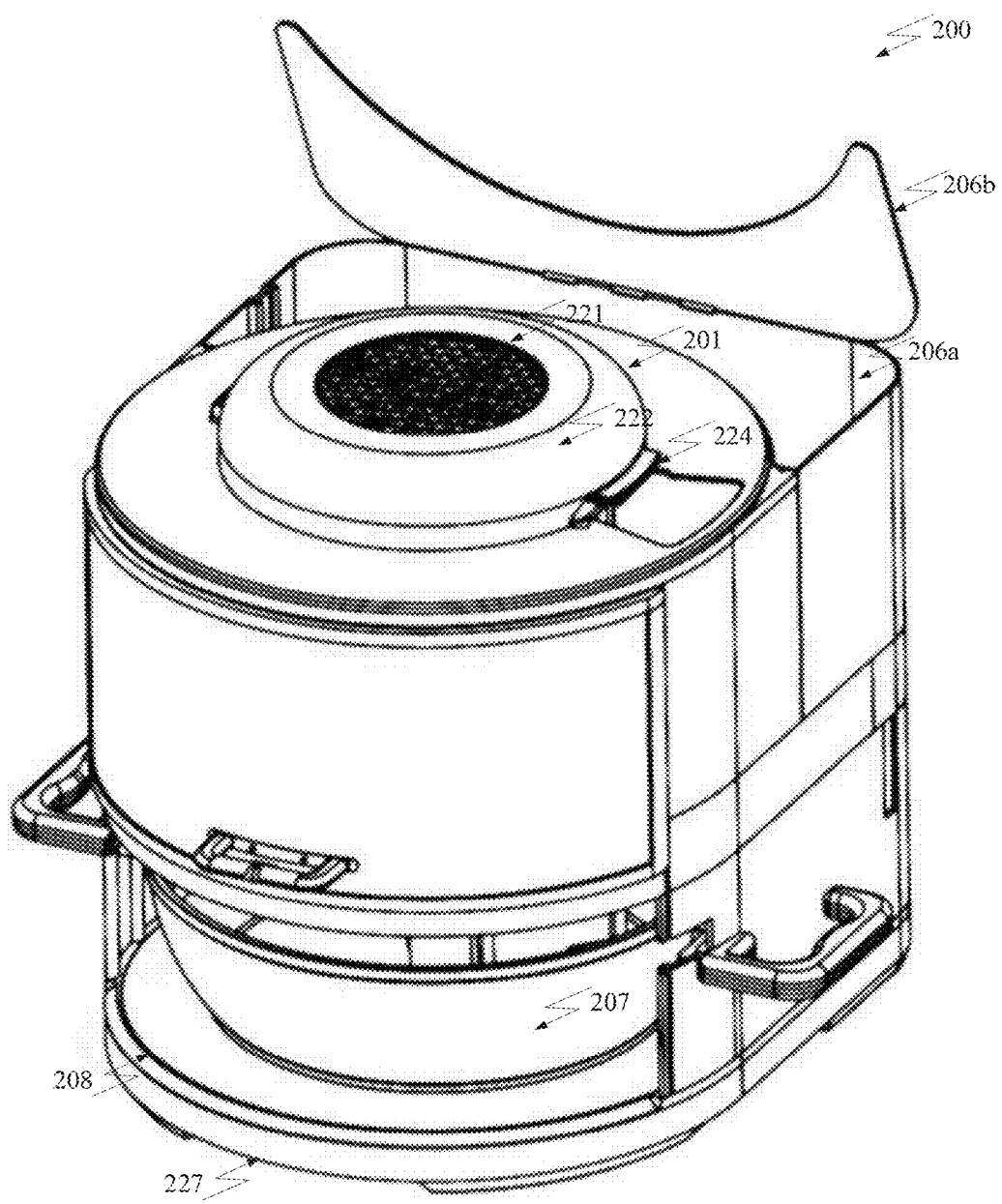
FIG. 2 is a perspective view of a preferred embodiment of the automatic meal preparation apparatus.

FIG. 2 shows the automatic meal preparation apparatus (AMPA) 200 which is capable of automatically preparing different recipes from various cuisines. The automatic meal preparation apparatus 200 is computer assisted for providing a no hassles experience to the user when preparing a meal.

FIG. 2 shows one embodiment of the automatic meal preparation apparatus (AMPA) 200 and its various constituent components. FIG. 2 shows spice rack 202 with lid 201 open. The lid 201 is openable and provides access to the spice rack 202, which provides the housing for the placement of the different spice cartridges 203 for dispensing spice/sauces into the cooking vessel 207.

Figure 3:
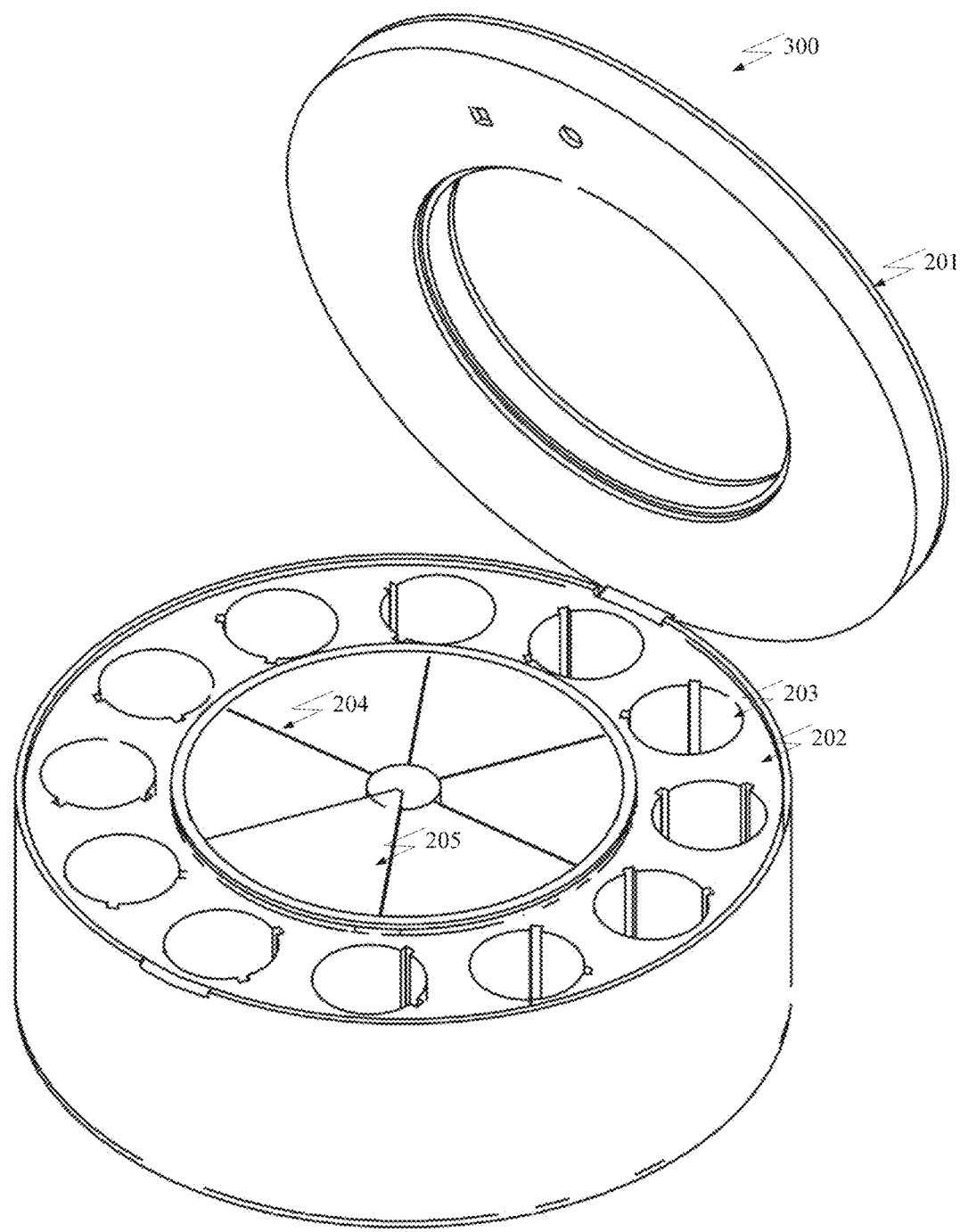
FIG. 3 is a view of a top section of the automatic meal preparation apparatus shown in FIG. 2.

As shown in FIG. 3, the spice rack 202 is removable and provides space where several spice cartridges 203 can be removably placed. Each spice cartridge 203 many contain a different spice or sauce. A mechanical mechanism may be provided for rotating the spice rack 202 so that different spices can be dispensed into the cooking vessel 207. A spice recognition system for identifying the right spice before dispensing may also be provided.

As shown in FIG. 3, the apparatus also has a raw ingredients placement compartment 204. The raw ingredients placement compartment 204 may be divided into multiple sub-compartments for placement of raw food before cooking. An opening 205 is provided in the raw ingredients placement compartment 204 so that the user is guided to place raw ingredients one at a time in each of the separate sub-compartments which are then selectively emptied into the cooking vessel 207 as the steps of the recipe are carried out.

In one embodiment, the middle section of the automatic meal preparation apparatus 200 provides a space for the placement of a cooking vessel 207 where the meal is prepared. A stirring arm (not shown) is preferably provided for stirring the ingredients in the cooking vessel. The stirring arm is preferably actuated by a motor (not shown) in the bottom (base) section 208 of the apparatus.

In one embodiment, as shown in FIG. 2, the apparatus has a water reservoir 206a with a lid 206b. The water reservoir is preferably in selective fluid communication with the cooking vessel. The recipe may include instructions for dispensing water into the cooking vessel or for heating the water separately to provide steam to the cooking vessel.

(Note that certain embodiments may also include an oil reservoir for frying applications, not shown. Alternatively, oil may be included as a spice/sauce in one of the spice/sauce cartridges.)

The apparatus preferably also includes a ventilation fan that is designed to keep the humidity level in the automatic meal preparation apparatus at the correct level. In addition, this fan keeps the internal temperature regulated for cooking particular types of meals.

Aspects of the ventilation system are also shown. Air enters the apparatus through vents through an intake around area 227. Air flows generally upward through the housing at a central column to exit through lid vent 221 in lid 222. The lid is openable through latch 224. A fan may be provided in the vented lid (not shown). This fan communicates with exterior vent 221. The electronics may be ventilated separately.

In one embodiment, the cooking vessel 207 is heated using induction heating. The cooking vessel may be of a metallic material or another material that is induction-friendly.

The bottom section 208 houses various sub-components including the electronics for controlling the various functions of the automatic meal preparation apparatus (not shown) and the induction coils (not shown) for inducing heat in the cooking vessel 207.

The AMPA may have a display screen e.g. an LCD screen that may be used for providing visual cues and a user interface for a user interacting with the AMPA. There may be one or more buttons or other input mechanisms using which a user may be able interact with the visual interface for example by pressing a down button scroll through the local database of recipes stored in the AMPA, or enter a WiFi password by pressing the buttons to cycle through a list of alphabets, digits and symbols, or receive visual alerts from the AMPA about the meal that is being prepared e.g. "Meal will be ready in 10 minutes". The display screen may preferably be rectangular, black and white or color, and may use LCD (liquid crystal display), LED (light emitting diodes) or OLED (organic light emitting diodes) technology depending on the implementation. The display screen may be used for displaying images, icons, text and other visual clues to the user; and the invention is not limited to the examples cited here. A remote control with such controls and/or screens may also be provided.

Although in this disclosure we use the term "spice dispensing device" to mean a cartridge or container that contains an individual spice, or a combination of spices but in fact it may contain either a spice, a combination of spices, a sauce, a paste or liquids like vinegar and other ingredients that may be used in cooking e.g. food seasonings, coloring, marinates, vinaigrettes, dressings and the like. Additionally the spice dispensing device may contain ground spice that is dispensed as is, or a solid spice that is ground on an as need basis before being dispensed, or a solid spice that is dispensed whole, or may contain pastes, thick liquids or gels, or may contain liquids or any other forms of solutions or emulsions containing ingredients used in meal preparation. In the preferred embodiment, the spice dispensing device is cylindrical but the shape of the spice dispensing device may vary from one embodiment to the other.

Top section 300 provides a mechanical mechanism for rotating the spice rack 202 to dispense the right spice, a spice recognition system for identifying the right spice, a raw ingredient rack 204 which has several sub-compartments for placement of raw food (before cooking); the sub-compartments are selectively emptied into the cooking vessel. These components are computer controlled so that the right ingredient is selected at the right time to be automatically selected and dispensed into the cooking vessel.

The spice rack 202 has several removable spice dispensing devices 203 that are filled with particular spices. A computer controlled rotatable mechanism for the selection of spice cartridge above the cooking vessel. It also provides a computer controlled spice dispensing mechanism for the precise measurement and dispensation of the spice in the right amount, right combination and at the right time when automatically preparing a meal according to the selected recipe.

The top section 300 also has a spice recognition system that is computer controlled so that the spice dispensing can be automatically recognized and selected before the spice is dispensed into the cooking vessel. There may preferably also be a spice level measurement mechanism so that the level of spices can be checked before the meal preparation process is initiated.

Figure 4:
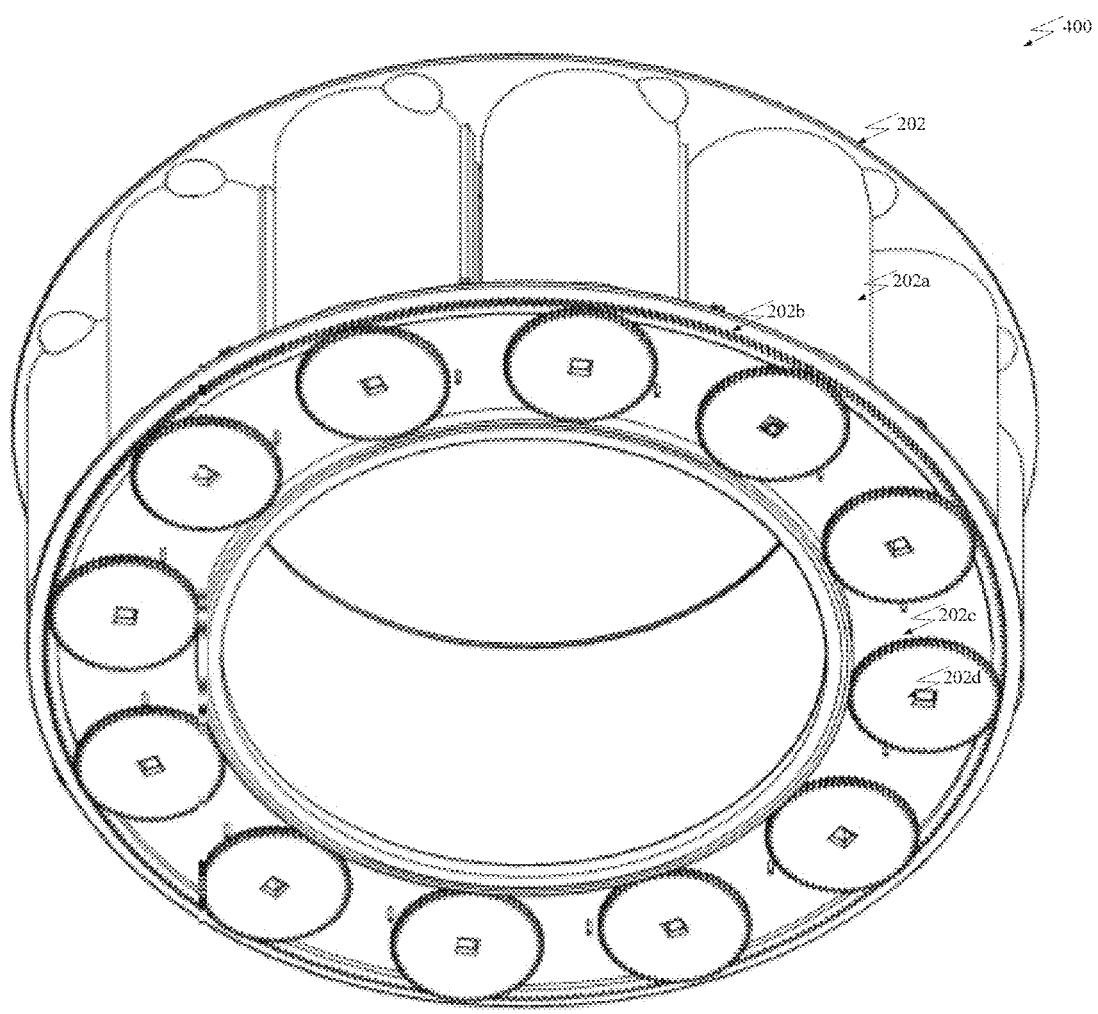
FIG. 4 is a bottom view of a spice rack.

FIG. 4 shows the bottom section 400 of the spice rack 202. The spice rack 202 has several (preferably) cylindrical cavities 202a where the spice dispensing devices 203 can be placed. The spice rack 202 has a gear assembly 202b that moves the spice rack 202 within the top section of the AMPA to select the right spice dispensing device. The spice rack 202 has several individual gear assemblies 202c, one each for each of the spice rack cavities (where each cavity may 202a may have a spice dispensing device 203 containing a different spice may be placed) that moves the spice dispensing device 203 for dispensing the right amount of spice when the automatic meal preparation process is in progress. Each individual gear assembly 202c has an opening 202d that aligns with the individual spice dispensing device 203.

Figure 5:
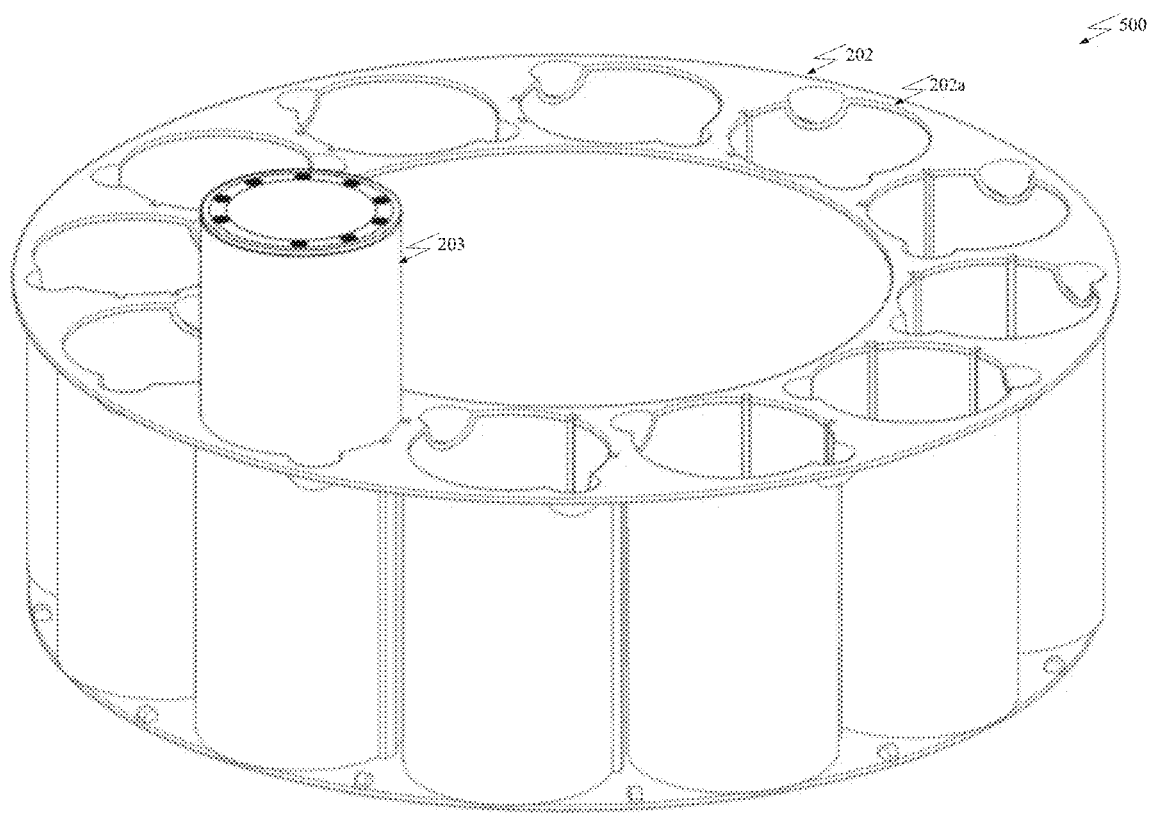
FIG. 5 is a top view of a spice rack.

FIG. 5 shows the top view 500 of the spice rack 202. The spice rack 202 has several cylindrical cavities 202a where the spice dispensing devices 203 can be placed. The spice dispensing device 203 is shown being placed in one of the several cavities 202a.

Figure 6A:
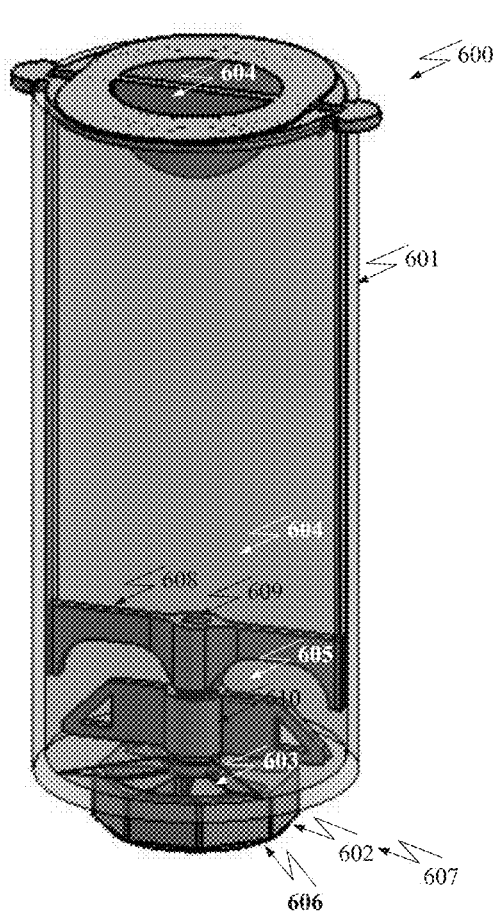
FIGS. 6A and 6B are perspective and sectional views respectively of an exemplary powder (dry) spice dispensing device.
Figure 6B:
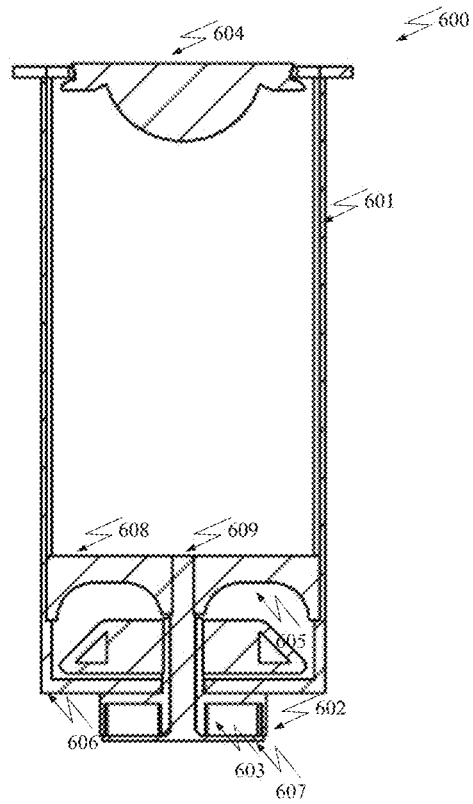

FIGS. 6A and 6B show a view of one embodiment of the spice dispensing device, here for use with powdered (or dry) spices. The powder cartridge 600 is used to automate the dispensing of powdered/crystallized/flaked seasonings (contents). The cylindrical body 601 of the container holds the contents to be dispensed (not shown). At the bottom of the cartridge there is an octagonal part 602 with hopper holes 603 to hold a fixed amount of content. The contents are gravity fed into a large slot 604 at the top of the cartridge into the hopper slot 605. There is a plate 606 underneath the hopper preventing the contents from falling freely. The container and plate underneath are fixed, while the hopper octagon 602 is free to rotate. As the hopper 602 rotates it moves the contents from the loading slot 604 above to the dispensing slot 607 below (on the opposite side of the container). Here the contents are released by gravity as there is an open slot 607 in the bottom plate 606.

To help prevent contents from "ramping" (where contents builds a slope around the loading slot), there is an additional mechanism inside the cartridge 600. A sweeper 608 piece rotates with the hopper octagon 602, and is connected to a positive driving shaft 609 through the bottom of the container. This sweeper 608 sweeps the bottom of the container moving any contents towards the hopper octagon 602, and cuts through the contents to prevent caking and keep the contents loose. Above this is a mount 610 which is used to keep the bottom plate 606 stationary to the container (this fixed connection is in the center of the positive driving shaft 609). A fixed volume of contents is dispensed over each rotation equivalent to the volume of the hopper holes 603.

In one embodiment of the invention the spice dispensing device may be manufactured with hydrophobic material so that it repels any moisture that allows for a longer shelf life of the spice contained within.

In one embodiment of the invention there may be a mechanism for opening a spice dispensing device cartridge gate which has a one directional opening and only opens when a spice dispensing device within the spice rack is aligned correctly.

The dry spices for use in this type of cartridge or dispensing device may include but are not limited to culinary herbs, spices and/or any other food or drink additives of mostly botanical origin but may include minerals like salt, used for flavoring, seasoning or coloring. Examples include but are not limited to the following: salt, pepper, paprika, oregano, cinnamon, cloves, chili flakes, etc. The spices may be provided in ground or powdered form. In other embodiments, the spices may be provided whole, and optionally, ground on demand.

FIGS. 7A and 7B show an exemplary liquid or paste cartridge. The liquid cartridge is used to dispense liquids/sauces/pastes (for simplicity, all referred to herein as "liquid"). The container body 700 is used hold the liquid (not shown), along with a valve 701 at the bottom to prevent leaking. Inside the container is mechanism to push liquid out (similar to a syringe) by increasing pressure in the chamber. In the middle of the container is a threaded rod 702 which is free to rotate relative to the container 700. The internal driving disk 703 is connected to this threaded rod 702. The inside of the container and the driving disk 703 are preferably in the profile of an ellipse, as this shape prevents relative rotation between the dispensing disk 704 and the container. Although the disk cannot turn relative to the container it can traverse the container in up/down directions.

To dispense liquid, the container 700 is turned (rotated) while the threaded rod 702 is held in place by the flanges 705 at the top. Because the dispensing disk 704 cannot rotate relative to the container it is forced up/down by the thread pitch on the rod 702. When being forced down this increases the pressure of the liquid opening the valve and allowing the liquid to flow out. When it is not rotating the flow of liquid stops, and the valve prevents leaking.

Some examples of liquid or paste ingredients include Thai chill sauce, spicy red curry paste, aged cooking wine, aged soya sauce, garlic paste, ginger paste, vinegar, flavored or regular oils, wasabi, etc.

Each spice dispensing device may contain a unique code that may define its contents, its date of manufacture, its quantity, its brand, etc. In one embodiment this metadata about the spice dispensing device may be saved on a server and the AMPA acquires this metadata from the server when a spice dispensing device is placed in the spice rack and the top lid of the AMPA is closed. The AMPA may have sensors or electronic sub-components that may scan or read the unique code from the individual spice dispensing device. One such method is described later, but there may be other techniques suited to this and the intent is to cover such methods known to ones familiar with the art.

Each spice dispensing device may have a code that identifies it uniquely. Such unique code in addition to providing the spice identification, may also provide details of what kind of spice or sauce is contained in the cartridge, where the spice dispensing device was purchased from, when the spice dispensing device was manufactured, if there is an expiry date of the contents of the spice dispensing device when does it expire, what free or paid privileges may be associated with that particular spice dispensing device for example how may free recipes or free instances of a recipe can be downloaded from the recipe portal etc.

In another embodiment of the invention the unique code of a spice dispensing device may be directly read by the AMPA when the top lid of the apparatus is closed. Such automatic unique code reading may include steps like scanning the unique spice dispensing device code or ID, and if the details associated with the unique code are not available locally on the AMPA acquiring the same from the recipe portal or the like by connected to the internet to access such a resource. The list of recipes may be automatically filtered so that they include only recipes that can be prepared with the spice dispensing device whose unique code was scanned earlier.

Figure 8:
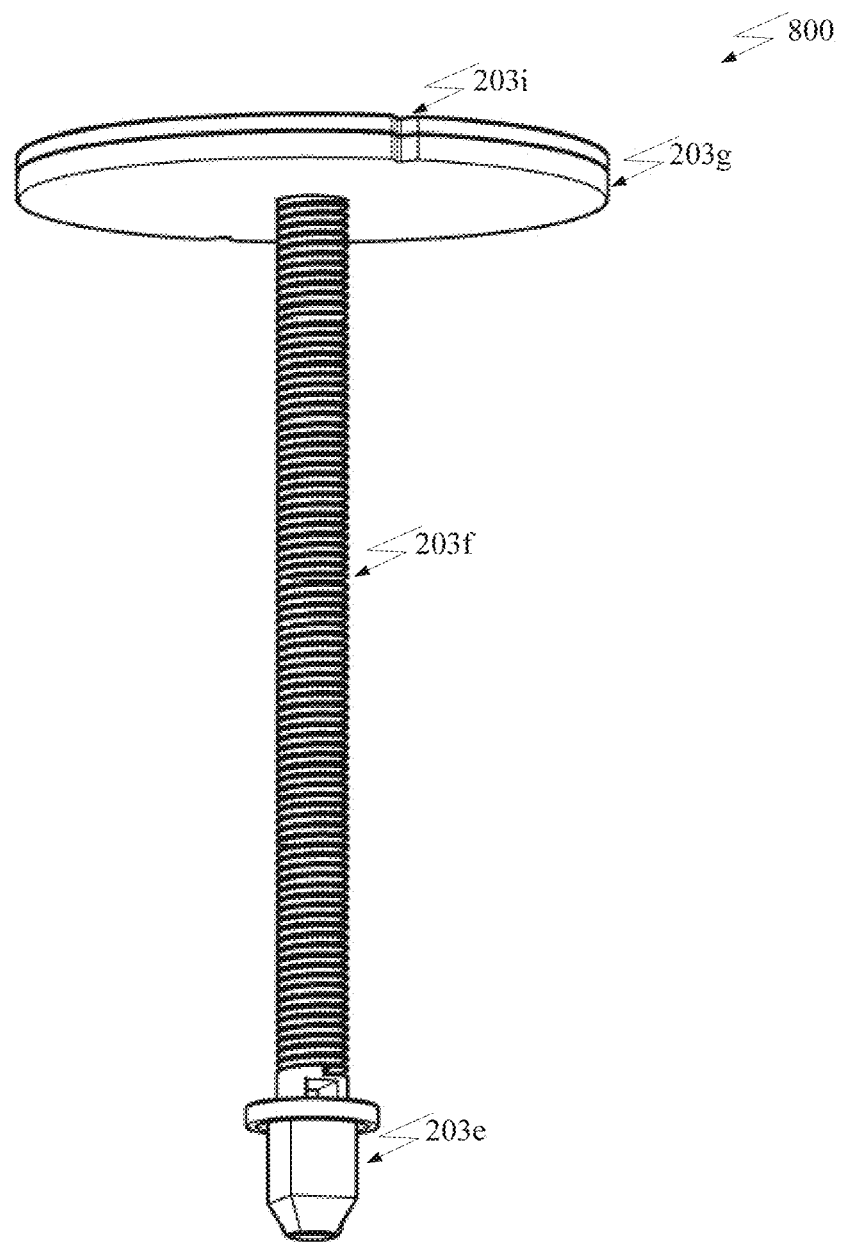
FIG. 8 is a view of a dispensing disc for certain embodiments of the dry spice dispensing device.

FIG. 8 shows one embodiment of a plunger based dispensing mechanism 800 with a threaded central shaft 203*f*, a disc 203*g* and one or more notches 203*i* on the disc 203*g* that corresponds to the ridge 203*h* and keeps the disc 203*g* from rotating as the central shaft 203*f* that is threaded. It is rotated by a motor to dispense the spice contained in the spice dispensing device 203.

Figure 9:
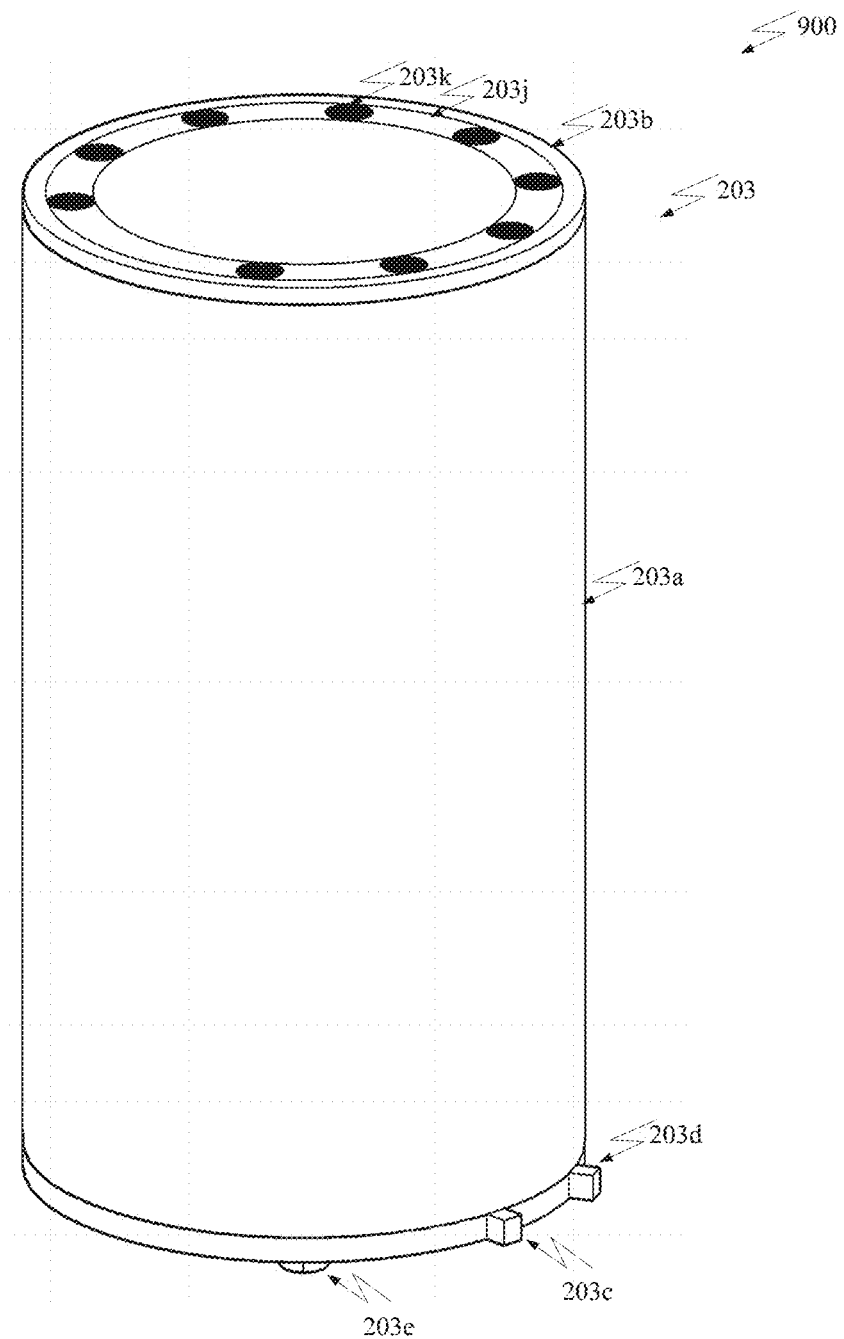
FIG. 9 is a view of a top section of one embodiment of the spice dispensing device with scannable label.

FIG. 9 shows one embodiment 900 showing top section 203*b* of the spice dispensing device 203 which has a printed label 203*j* is permanently glued to the top of each spice dispensing device. The printed label 203*j* has a 9-bit block dotted sticker. One bit block dot is shown with 203*k*.

Figure 10:
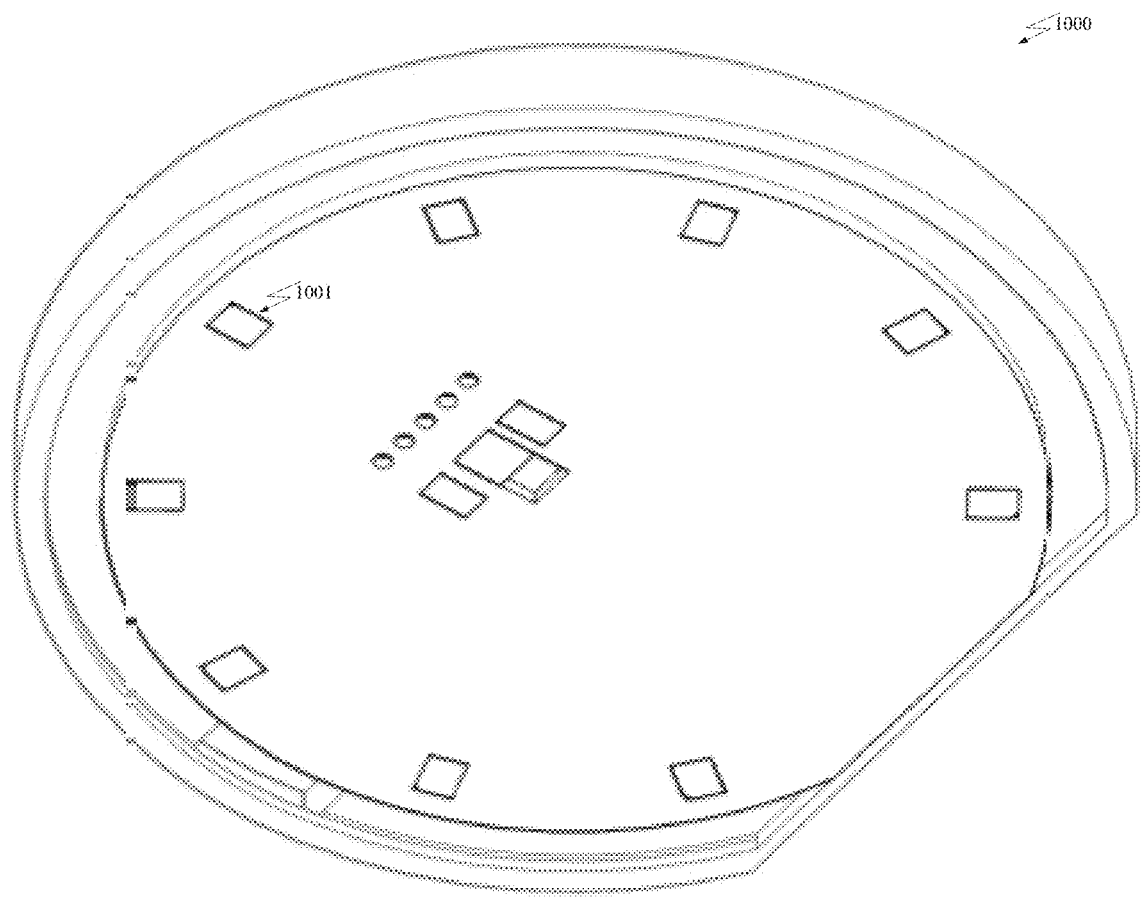
FIG. 10 is a view of a spice dispensing device ID reader for use with labels of the type shown in FIG. 9.

FIG. 10 shows a spice dispensing device ID Reader 1000 according to one embodiment. The spice dispensing device ID Reader 1000 uses an array of 9 IR Emitter/IR Phototransistor pairs 1001.

The label 203*j* has an IR reflective surface with white background and black dots 203*k*. The white material reflects more IR while the black material absorbs most IR. The IR Emitter/IR Phototransistor pairs 1001 align with the black dots 203*k* (or the positions where black dots should be) on the sticker/label 203*j*. In one embodiment the distance of reader to cartridge label is <3 mm for optimal reading.

When a reading is required to detect the presence and to acquire the identification of a spice dispensing device 203, all IR Emitters are all turned on for a short burst, the IR Phototransistor sends analog voltage to the CPU. The analog signal is converted into high bound and low bound, converting the readings into 1 or 0; thus forming 9-bits of data to identify the actual spice dispensing device cartridge.

The reading from a spice dispensing device 203 is performed when the lid 201 to the AMPA is closed. The reading is performed one spice dispensing device at a time. The spice dispensing device ID that is read from the label using the 9-bit of data is then looked up in the local database of spices. If the local database does not find the spice with the identified ID, then it attempts to connect to the Internet to download this information from a central database that is accessible over a network.

Figure 11:
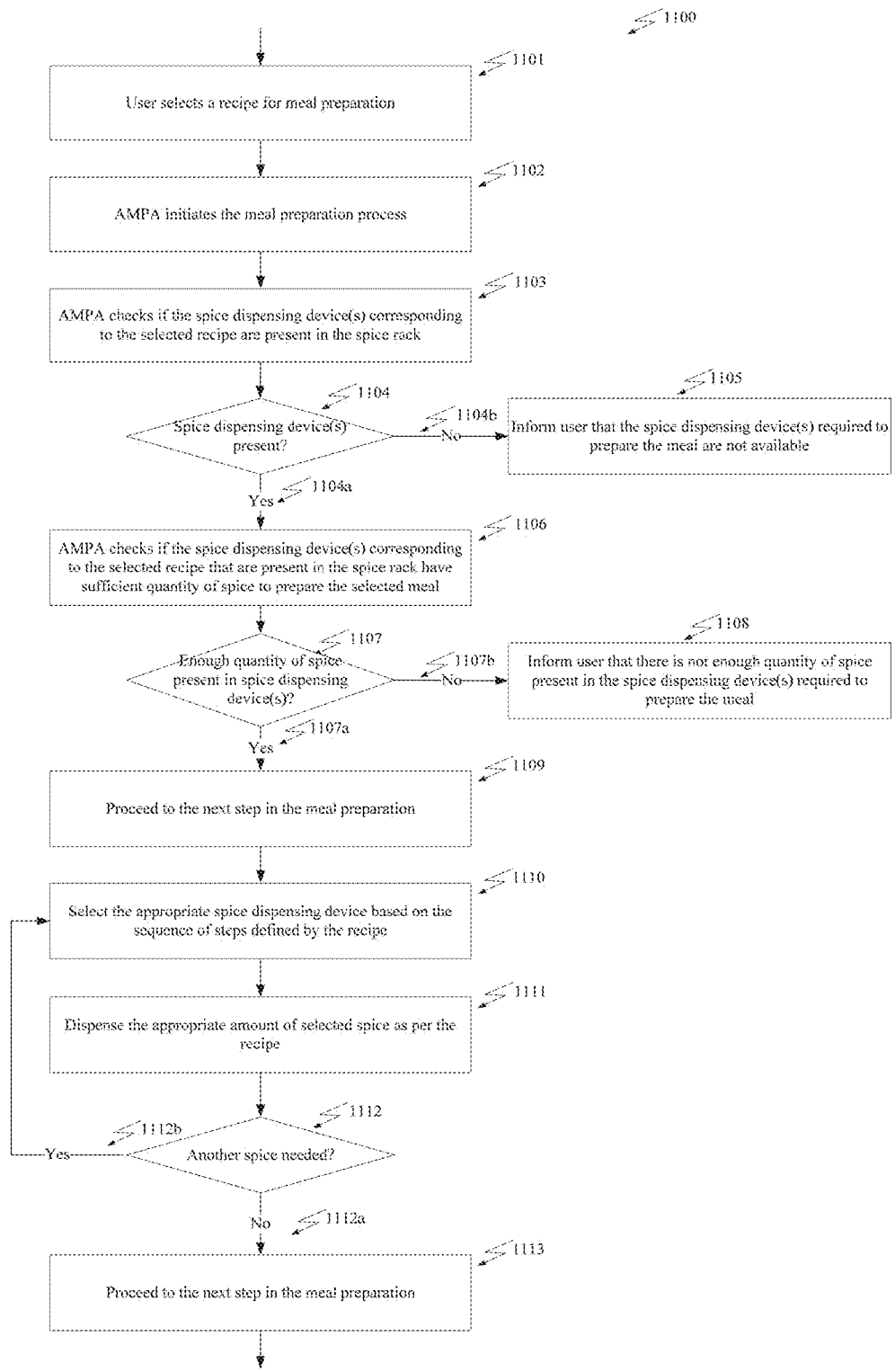
FIG. 11 is a flow diagram of a spice dispensing process using cartridge presence and quantity detection.

FIG. 11 shows one embodiment of the present method 1100. The user selects a recipe for meal preparation 1101. In one embodiment the recipe may be selected from a companion app on a tablet. The user sends the selected recipe from the tablet to the automatic meal preparation apparatus. The user may send the recipe by selecting a recipe and then clicking a button "Send to AMPA", or by performing a gesture on a touchscreen of the tablet e.g. flicking the selected recipe.

In one embodiment the recipe is received by the automatic meal preparation apparatus over the wireless connection e.g. a Bluetooth connection or a WiFi connection etc. While the preferred embodiment of the invention uses Bluetooth LE for wireless connectivity between the tablet and the AMPA, in other embodiments wireless technologies like Bluetooth Classic, Near Field Communications (NFC), InfraRed (IR), WiFi Direct and the like may be used instead.

In one embodiment the downloaded recipe is saved to the local database of recipes in the automatic meal preparation apparatus and is optionally categorized based on the cuisine type, or categorized based on the ingredients, or categorized based on the calories e.g. a low calorie meal, or added alphabetically or added under a chef name etc.

In one embodiment the newly downloaded and saved recipe becomes available for meal preparation and a user can search for the recipe by name (e.g. Chilli Chicken), by cuisine type (e.g. Chinese), by calorie count (e.g. medium calorie meal), by ingredient type (e.g. chicken), by chef name (e.g. Bobby Flay) etc.

In one embodiment the newly downloaded recipes may optionally only prepare a meal a given number of times e.g. a Thai Chicken recipe may be used 10 times only and may require the purchase of additional instances of meal preparation after the initial 10 instances have been used.

The AMPA initiates the meal preparation process 1102. The AMPA checks if the spice dispensing device(s) corresponding to the selected recipe are present in the spice rack 1103. The system checks whether the spice dispensing device is present 1104. There may be an electronic method for identifying a spice dispensing device. According to one embodiment each spice dispensing device is equipped with a mechanism for identifying each spice cartridge using a 9-bit code that is put on the top of each spice dispensing device using a sticker/label. One such mechanism is described with respect to FIGS. 9 and 10. This mechanism is used for checking the presence of a spice dispensing device in the spice rack as well to identify each of the spice dispensing devices found in the spice rack.

If No 1104*a*, there is no spice dispensing device present, then the user is informed that the spice(s) required to prepare the meal are not available 1105. In one embodiment the warning may be displayed on a screen of the user interface (e.g. an LCD screen) on the AMPA. In another embodiment the warning may be auditory, where a sound file is played through a speaker built in the AMPA. In yet another embodiment the warning may be displayed along with an auditory warning on a user interface of the companion app that may be installed on a user's mobile device like a tablet or a Smartphone.

The AMPA checks if the spice dispensing device(s) corresponding to the selected recipe that are present in the spice rack have sufficient quantity of spice to prepare the selected meal 1106, that is, if the spice levels in the spice dispensing device(s) are above critical and include sufficient quantity to prepare the chosen recipe and chosen portion size.

The system checks whether there is sufficient quantity to spice in the said spice dispensing device(s) to prepare the selected recipe 1107.

There may be an electronic method for measuring the amount of spice remaining in a spice dispensing device 203. According to one embodiment the spice dispensing device 203 is equipped with a mechanism for distance reader that measures the distance of the spice level from the top of the spice dispensing device 203. One such mechanism may use a distance reader that has an IR Emitter+IR Phototransistor coupled up to a capacitor. The disc 203g inside the spice dispensing device 203 has a IR reflective surface. When a reading is required to estimate the amount of spice still remaining in a spice dispensing device, the IR Emitter is turned on by sending an electrical current through it for a duration of time (T). In the duration (T), the IR Phototransistor charges the capacitor, and when the capacitor discharges, analog signal is picked up by CPU. A reading for the capacitor discharge count per duration of time (T) is recorded.

Since there is a direct correlation between discharge count and distance between the reader and the reflective surface it implies that there is also an inverse correlation between distance to reflective surface and the amount of spice remaining in the spice dispensing device, such that the volume of spice is calculated using the formula for the volume of a cylinder.

$$\text{Volume of cylinder} = pi*(\text{disk radius} - \text{core rod radius})$$
$$A2*(\text{max distance constant} - \text{current distance})$$

The system may inform user that there is not enough quantity of spice present in the spice dispensing device(s) required to prepare the meal 1108. In one embodiment the warning may be displayed on a screen of the user interface (e.g. an LCD screen) on the AMPA. In another embodiment the warning may be auditory, where a sound file is played through a speaker built in the AMPA. In yet another embodiment the warning may be displayed along with an auditory warning on the user interface of the companion app that may be installed on a mobile device like a tablet or a Smartphone.

The system then proceeds to the step in the meal preparation 1109.

The system selects the appropriate spice dispensing device based on the sequence of steps defined by the recipe 1110.

The appropriate amount of selected spice is dispensed as per the recipe 1111. The system checks whether another spice is needed 1112.

If No 1112a, another spice is not needed, the system proceeds to the next step in the meal preparation 1113. If Yes 1112b, another spice is needed, the system proceeds to Step 1110. This process may be repeated for as many spices as may be needed by the recipe of the meal being prepared.

A typical recipe usually has two components: an "Ingredients List" and "Directions". The ingredients list provides a list of ingredients that are going to be used in the recipe when cooking the meal. The directions provide a list of steps for a user to follow when cooking the meal using the list of ingredients. An exemplary recipe is shown below with the list of ingredients and the steps to follow in directions:

Ingredient
   6 skinless, boneless chicken breast halves
   1 teaspoon garlic salt
   ground black pepper to taste
   2 tablespoons olive oil
   1 onion, thinly sliced
   1 (14.5 ounce) can diced tomatoes
   ½ cup balsamic vinegar
   1 teaspoon dried basil
   1 teaspoon dried oregano
   1 teaspoon dried rosemary
   ½ teaspoon dried thyme Directions
1. Season both sides of chicken breasts with garlic salt and pepper.
2. Heat olive oil in a skillet over medium heat; cook seasoned chicken breasts until chicken is browned, 3 to 4 minutes per side. Add onion; cook and stir until onion is browned, 3 to 4 minutes.
3. Pour diced tomatoes and balsamic vinegar over chicken; season with basil, oregano, rosemary and thyme. Simmer until chicken is no longer pink and the juices run clear, about 15 minutes. An instant-read thermometer inserted into the center should read at least 165 degrees F. (74 degrees C.).

Below is an exemplary sequence of generic steps that may be used in any combination and repetition to derive an "AMPA Understandable Recipe" from the two components of a "User Understandable Recipe" namely the "Ingredients List" and the "Directions".

Recipe
   Name: name of recipe (has to be unique)
   Description: brief summary of recipe
   Serving_Size: 1 portion is the quantity of food suitable for 1 person
   Steps
      seq—the sequence this step happens
      quantity—the amount associated in this step
      unit_of_measure—the unit used for the quantity
      command:
         Temp—adjust temperature to some degrees (this is a feedback mechanism, relying on induction coil and temperature sensor)
         Wait—no commands for x period of time
         Spice—inject/dispenses x ml of a spice or sauce
         Fresh—dispense a fresh ingredient
         Stir—mix for x seconds at y speed in z direction
         Cut—cut fresh ingredient e.g. dice, slice, cube
         Drain—release moisture or liquid to reduce A typical "AMPA Understandable Recipe" usually has two components "Process Steps for AMPA to Instruct User" which provides a list of steps for a user to follow when preparing and placing the fresh/raw ingredients into the AMPA; and "Process Steps for the AMPA to Prepare the Meal"; which is a list of steps for the AMPA to execute internally when preparing the meal automatically without user interaction.

In one embodiment of the invention, the sequence of steps may be derived from the two components of the "User Understandable Recipes" namely the "Ingredients List" and the "Directions".

In one embodiment of the invention, the User Understandable Recipe may be converted into an AMPA Understandable Recipe using an AMPA Recipe Language. The AMPA Recipe Language may consist of a series of single action commands in a step-by-step chorological order. Specifically, a step in the AMPA Recipe Language may be composed as follows:

[action type] [quantity] [unit of measure (opt.)] [ingrd form factors (opt.)] [ingrd. name (optional)]

Thus the exemplary recipe shown earlier gets converted to the following steps:

[Inject] [2] [tsp] [olive oil]
[Heat] [150] [Celsius]
[Wait] [10] [seconds]
[Inject] [1] [tsp] [garlic salt]
[Inject] [0.50] [tsp] [black peppers]
[Stir] [3] [minutes] [fast, clockwise]
[Heat] [80] [Celsius]
[Dispense] [500] [g] [cut in halves] [boneless chicken breast]
[Cut] [100] [cubes] [chicken]
[Stir] [3] [minutes] [medium, clockwise]
[Stir] [3] [minutes] [medium, counter clockwise]
[Dispense] [250] [g] [cut in slices] [onion]
[Heat] [60] [Celsius]
[Stir] [3] [minutes] [medium, counter clockwise]
[Dispense] [400] [g] [cut in cubes] [tomatoes]
[Inject] [0.50] [cup] [balsamic vinegar]
[Inject] [1] [tsp] [oregano]
[Inject] [1] [tsp] [basil]
[Inject] [1] [tsp] [rosemary]
[Heat] [50] [Celsius]
[Stir] [3] [minutes] [slow, clockwise]
[Stir] [3] [minutes] [slow, counter clockwise]
[Stir] [3] [minutes] [slow, clockwise]

In one embodiment the User Understandable Recipe is converted into an AMPA Understandable Recipe by first looking at the directions; separating the ingredients, their quantities and meal preparation instructions; and using a database that stores the different ingredients into an ordered list of fresh ingredients and their quantities (e.g. meats and vegetables); a list of spices and their quantities (e.g. salt ½ teaspoon, black pepper ¼ teaspoon, red chillies ⅓ teaspoon, cumin ½ teaspoon etc.). and meal preparation instructions e.g. order of adding ingredients, temperatures for cooking, duration for cooking, instructions for mixing the ingredients e.g. add meat, blanch over medium heat for 10 minutes while stirring gently.

In one embodiment the database may include but is not limited to the following: a list of spices and spice cartridges and their equivalents; a list of different meats e.g. beef, lamb, chicken, turkey, fish and their preparation instructions e.g. fillet, cube, mince etc. and cooking temperature and duration thresholds; a list of vegetables e.g. potatoes, cauliflower, zucchini, tomatoes, onions, etc. and their preparation instructions e.g. slice, cube, puree, chop etc. and cooking temperature and duration thresholds; a list of oils and sauces and any other kind of ingredients that may be used in meal preparations. The database may also include the conversion factors for the spices e.g. 1 teaspoon is equal to 5 g dry, 1 teaspoon is equal to 5 ml liquid and 1 tablespoon is equal to 15 ml liquid etc.; a list of heating, temperature and duration conversions e.g. medium heat for 5 minutes may be converted to 45% of the induction heat for 4 minutes etc.; a list of stirring and mixing instructions and conversions e.g. stir gently for 3 minute may imply stirring at 10 RMP in clockwise direction, while stir vigorously for 5 minutes may imply stirring at 20 RMP first in clockwise and then in a anticlockwise direction.

In one embodiment the recipe creation, recordation and conversion may be done using an app that may execute on a mobile device like a tablet or a Smartphone. In another embodiment, the recipe conversion may be done using a web-based portal. In both cases the creation, conversion and saving of the recipe may be a stepped process that guides the user and ensures that there are no steps missed.

The preferred embodiment may provide a companion app for the AMPA that may preferably be installed by a user on a mobile/portable device e.g. a Smartphone or a tablet. The app interface may preferably provide an interface for connecting to the AMPA, connecting to the Recipe Portal and searching, browsing and downloading different recipes. The app may also preferably be able to send the downloaded recipe(s) to the AMPA and start the meal preparation process remotely.

In one embodiment, the companion app for the AMPA may be downloaded from an AppStore. Devices where such an app can be advantageously installed may include but not limited to an iPhone, iPad, Smartphones, Android phones, personal computers e.g. laptops, tablet computers, touch-screen computers running any number of different operating systems e.g. Android, MS Windows, Apple iOS, Linux, Ubuntu, etc.

In one embodiment there may be a Recipe Portal provided for the convenience of users, and the users may be required to create an account, and log in using the credentials of their individual account. There may optionally be means for users to create user accounts, get subscriptions for monthly recipes, pay for the accounts and subscriptions, or pay as you go methods for receiving recipes, gift, share, exchange, trade, swap, auction, etc.

In one embodiment the user launches automatic meal preparation apparatus companion app on the tablet, using the UI creates a new recipe and saves it with a unique name. Saving recipes with a unique name may be required to avoid duplication and in assisting with the categorization of the recipes.

In another embodiment a user may be provided with the ability to gift or share unused or extra instances of a meal preparation of a recipe to friends or family. There may means for swapping meal preparation instances where a first user may swap their extra instances of a first recipe with a second user for instances of a second recipe. The Recipe Portal may provide a means for sharing, trading, swapping, gifting of recipes or instance of recipes.

In another embodiment, there may be variations with different combinations and permutations of payments and recipe conversions. For example a user may pay $1.50 for a recipe conversion; or may pay $5.00 to convert 10 recipes that can each be prepared 5 times, or for the same $5.00 may convert 5 recipes that can be prepared 10 times each or other such combinations. In yet another embodiment of the invention a user may have a monthly/yearly subscription to the recipe portal that allows the user the privilege of either a given number of free recipe conversions or unlimited recipe conversions.

In another embodiment some recipe conversions may cost more than others e.g. a simple recipe costs less to convert than a complicated recipe.

In one embodiment, the apparatus may be able to interact with an app installed on a device. Such devices may include but are not limited to a mobile device for example a Smartphone, tablet, personal data assistant (PDA), game device, e-reader, a personal computer, a server, a laptop, a tablet computer, network appliance, set-top box, SmartTV, embedded device, computer expansion module, any appliances having internet or wireless connectivity.

In one embodiment, the app may be launched on a connected device. Devices that can benefit from the system may include but are not limited to a mobile device for example a Smartphone, tablet, personal data assistant (PDA), game device, e-reader, a personal computer, a server, a laptop, a tablet computer, network appliance, set-top box, SmartTV, embedded device, computer expansion module, any appliances having internet or wireless connectivity.

In one embodiment, a Bluetooth connection may be established between the AMPA and the connected device e.g. a tablet. In one embodiment, the Bluetooth connection request may be initiated by a user. In another embodiment, the Bluetooth connection request may be initiated by the app when the app is launched.

In one embodiment, the user may be able to set a timer so that the meal can be prepared at a later time. For example, prepare the meal in 2 hours or prepare the meal for 6 pm in the evening.

In one embodiment of the invention once the user has executed the steps necessary for the chosen recipe, start the meal preparation process.

In one embodiment of the invention, a user connects automatic meal preparation apparatus to the internet or other network e.g. a local area network (LAN). The connectivity with the internet may be via a wireless connection using Bluetooth, WiFi or other such technology, or via a hard-wired LAN connection.

It should be noted that the automatic meal preparation apparatus does not require internet connection for its normal operations i.e. for meal preparation. The connectivity may be only required when new recipes are to be downloaded to it or when a user wants to initiate the meal preparation process remotely or when a software or firmware update is required.

In one embodiment, a user accesses the central database of recipes using the wireless connection. The automatic meal preparation apparatus may provide a user interface and means for interacting with the user interface e.g. a built in LCD screen and buttons to navigate the list of recipes.

In one embodiment a user browses and selects a recipe from the list of recipes and the user experience of picking the recipe may include but is not limited to browsing a set of photos that show the prepared meals, either from a mobile device where the companion app is installed, or website e.g. a recipe portal which may provide means for searching recipes that have been categorized and cataloged based on a number of parameters e.g. type of cuisine, calorie count, chef, meal type (breakfast, lunch, dinner, dessert etc.), and the like.

In one embodiment the user may be able to browse and select the recipes from anywhere e.g. from the office and may be able to remotely download these to the automatic meal preparation apparatus either in real time or with a schedule e.g. select recipes during the weekdays and download the selected recipes on the weekend. Similarly, the user may also be able to schedule the automatic meal preparation apparatus to start cooking a meal based on a selected recipe from a remote location e.g. while riding a bus on the way to home.

In one embodiment, the user downloads the recipe directly into the automatic meal preparation apparatus. In another embodiment, the recipe may be first downloaded to a mobile device e.g. a tablet from where the recipe may be transferred to the automatic meal preparation apparatus either initiated by a user or automatically when the mobile device is in the vicinity of the automatic meal preparation apparatus using a wireless technology like Bluetooth.

Another embodiment may use WiFi as the wireless technology of choice to connect to the AMPA to the mobile device (e.g. a Smartphone or a tablet) of a user. In such an embodiment upon a first power up and successful connection to a WiFi network, the automatic meal preparation apparatus sends a ping to a central server with its public and private IP addresses and hardware identification e.g. a MAC address or other unique hardware identification. The central server is accessible over the internet and creates a new account for the said automatic meal preparation apparatus and provides the user with a user interface to enter a user name and a password to register the apparatus uniquely. Once the user has been able to enter the user name and password, the user is able to connect to the said automatic meal preparation apparatus via the internet using a browser and typing the URL for the portal e.g. www.kitchenmate.com and providing the log in credentials (user name and password). This way the user is now able to connect to his automatic meal preparation apparatus from anywhere using just a connected device with a browser e.g. a tablet with a browser. Once a user is able to connect to his automatic meal preparation apparatus, the user is able to download recipes to it, update its software or firmware, and initiate a meal preparation process either immediately or with a delay using a schedule.

In one embodiment, the user can control the automatic meal preparation apparatus in a local network without a companion app, by just using a web browser on a connected device. In one embodiment of the invention, the automatic meal preparation apparatus creates an HTTP server on the local WiFi network. Upon a successful registration, the public and private IP addresses along with the MAC address of the automatic meal preparation apparatus are stored and published to the central server. A user can connect to his unique automatic meal preparation apparatus from the portal e.g. www.kitchenmate.com, the central server then is able to issue commands and queries to the said automatic meal preparation apparatus using the public IP address over HTTP. In case the public IP address happens to be behind a firewall, a connection can still be made using the local network IP address and using technologies like Ajax to control it.

Thus a user can gain remote access to the his automatic meal preparation apparatus by visiting the central web application e.g. www.kitchenmate.com where queries and commands can be sent to the said automatic meal preparation apparatus connected on the same public IP address.

In one embodiment when adding spices to a meal being prepared by the AMPA, the quantities of spice may be tailored to the actual weight of the fresh produce added by a user. For example if a recipe calls for 200 g of beef but a user added 250 g of beef to the fresh rack, the quantities of different spices may be automatically adjusted based on the amount/weight of the fresh ingredient added by the user. In such embodiments to the invention, there may be an electronic scale or an electronic weighing mechanism built-in the AMPA that has the ability to sense the weight of the fresh ingredients added by a user. Thus, the quantities of the different spices are adjusted based accordingly in proportion to the amount/weight of the fresh ingredient added by the user.

It should be understood that although the term application has been used as an example in this disclosure but in essence, the term may also imply to any other piece of software code where the embodiments of the invention are incorporated. The software application can be implemented in a standalone configuration or in combination with other software programs and is not limited to any particular operating system or programming paradigm described here. Thus, it is intended to cover all practical applications and user interactions.

Several exemplary embodiments/implementations of the invention have been included in this disclosure. There may be other methods, and the intent is to cover all such scenarios. The application is not limited to the cited examples, but the intent is to cover all such areas that may be benefit from this invention.

The examples noted here are for illustrative purposes only and may be extended to other implementation embodiments. While several embodiments are described, there is no intent to limit the disclosure to the embodiment(s) disclosed herein. On the contrary, the intent is to cover all practical alternatives, modifications, and equivalents.

What is claimed is:

1. A spice dispensing device for an automatic meal preparation apparatus, comprising:
    a substantially cylindrical replaceable cartridge containing a volume of liquid or paste spice, and an opening in the cartridge has a valve to prevent leakage of the liquid or paste;
    a dispensing mechanism, built into the cartridge, includes a dispensing disk on a threaded rod, and the dispensing disk, when actuated, operates to force the predetermined volumetric dose of the liquid or paste through the valve;
    wherein the cartridge is sized and shaped to be placed vertically into the automatic meal preparation apparatus in a rack for containing a plurality of such cartridges;
    wherein the cartridge has a scannable encoding on or attached to a top surface thereof, the scannable encoding being keyed to a list of eligible recipes for the apparatus using the spice;
    wherein the cartridge has physical locating features to ensure a particular alignment within the rack in which the scannable encoding is readable when a lid of the apparatus is closed; and
    wherein the dispensing mechanism is selectively actuatable following selection of an eligible recipe by a user and detection of an amount of fresh food added in the apparatus by the user for:
        aligning the cartridge with a position in the rack for direct access to a cooking vessel of the apparatus;
        the dispensing disk isolates a volumetric dose corresponding to the selected recipe, adjusted for the detected amount of fresh food in the apparatus;
        the dispensing disk moving the dose toward the opening in the bottom of the cartridge, and dispensing the dose of spice through the valve in the opening of the cartridge and into the cooking vessel.

2. The spice dispensing device of claim 1, wherein the cartridge is sized to contain a volume of spice to permit multiple volumetric doses from the cartridge.

3. The spice dispensing device of claim 1, wherein the cartridge is prefilled with spice.

4. The spice dispensing device of claim 1, wherein the cartridge is refillable.

5. The spice dispensing device of claim 1, wherein the cartridge is weighable by the apparatus to determine a remaining quantity of spice.

6. The spice dispensing device of claim 1, wherein the level of spice in the cartridge is readable by the apparatus to determine a remaining quantity of spice.

7. The spice dispensing device of claim 1, wherein the locating features are ridges.

8. The spice dispensing device of claim 1, wherein the locating features are notches.

9. The spice dispensing device of claim 1, wherein the scannable encoding is keyed to stored privileges or permissions.

10. The spice dispensing device of claim 1, wherein the scannable encoding is keyed to an expiry date of the spice.

11. The spice dispensing device of claim 1, wherein the scannable encoding is a 9-bit encoding.

* * * * *